United States Patent
Kohlhuber

(10) Patent No.: US 11,685,410 B2
(45) Date of Patent: Jun. 27, 2023

(54) DRIVER ASSISTANCE SYSTEM AND METHOD FOR AUTOMATED DRIVING WITH AUTOMATED LONGITUDINAL GUIDANCE

(71) Applicant: Bayerische Motoren Werke Aktiengesellschaft, Munich (DE)

(72) Inventor: Florian Kohlhuber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 123 days.

(21) Appl. No.: 17/053,653

(22) PCT Filed: May 3, 2019

(86) PCT No.: PCT/EP2019/061454
§ 371 (c)(1),
(2) Date: Nov. 6, 2020

(87) PCT Pub. No.: WO2019/215051
PCT Pub. Date: Nov. 14, 2019

(65) Prior Publication Data
US 2021/0188323 A1    Jun. 24, 2021

(30) Foreign Application Priority Data

May 9, 2018    (DE) ...................... 10 2018 207 301.5

(51) Int. Cl.
*B60W 60/00*    (2020.01)
*B60W 30/09*    (2012.01)
*B60W 50/08*    (2020.01)

(52) U.S. Cl.
CPC ........ *B60W 60/0053* (2020.02); *B60W 30/09* (2013.01); *B60W 50/082* (2013.01);
(Continued)

(58) Field of Classification Search
None
See application file for complete search history.

(56) References Cited

U.S. PATENT DOCUMENTS

| 4,947,952 A * | 8/1990 | Kajiwara ................. B60T 8/48 180/169 |
| 6,411,883 B1 | 6/2002 | Basten |

(Continued)

FOREIGN PATENT DOCUMENTS

| DE | 199 58 520 A1 | 6/2001 |
| DE | 699 20 515 T2 | 11/2005 |

(Continued)

OTHER PUBLICATIONS

International Search Report (PCT/ISA/210) issued in PCT Application No. PCT/EP2019/061454 dated Jul. 26, 2019 with English translation (seven (7) pages).

*Primary Examiner* — James J Lee
*Assistant Examiner* — Tawri M McAndrews
(74) *Attorney, Agent, or Firm* — Crowell & Moring LLP

(57) ABSTRACT

A driver assistance system for a motor vehicle for automated driving with automated longitudinal guidance, wherein when automated longitudinal guidance is active in an automatic mode, automated longitudinal guidance is brought about taking into account a predefinable setpoint speed. The system includes a first detection unit, configured to detect a defined stationary state situation which is set on the basis of a preceding automated braking process of the motor vehicle to the stationary state, a second detection unit, configured to detect accelerator pedal activation, and an evaluation and control unit, configured to actuate a manual mode when actuator pedal activation is detected during a defined stationary state situation.

12 Claims, 2 Drawing Sheets

(52) U.S. Cl.
CPC ..... *B60W 2520/04* (2013.01); *B60W 2520/06* (2013.01); *B60W 2520/10* (2013.01); *B60W 2540/10* (2013.01); *B60W 2540/12* (2013.01)

(56) References Cited

U.S. PATENT DOCUMENTS

| | | | |
|---|---|---|---|
| 6,820,709 B1 | 11/2004 | Zimmermann et al. | |
| 2010/0152963 A1 | 6/2010 | Heckel et al. | |
| 2011/0118939 A1 | 5/2011 | Kawamata et al. | |
| 2012/0053807 A1* | 3/2012 | Salinger | B60W 50/12 |
| | | | 701/93 |
| 2012/0166058 A1 | 6/2012 | Armbrust | |
| 2015/0166063 A1* | 6/2015 | Ishihara | B60W 60/0051 |
| | | | 701/41 |
| 2015/0168157 A1* | 6/2015 | Hoch | B60W 40/107 |
| | | | 701/400 |
| 2016/0159351 A1* | 6/2016 | Lee | B60W 30/16 |
| | | | 701/93 |
| 2017/0212525 A1* | 7/2017 | Wang | G01C 21/3697 |
| 2017/0227959 A1* | 8/2017 | Lauffer | B60W 50/0098 |
| 2017/0361841 A1* | 12/2017 | Kojo | B60W 30/16 |
| 2018/0101170 A1* | 4/2018 | Cawley | G05D 1/0061 |
| 2018/0239352 A1* | 8/2018 | Wang | B60W 60/0053 |
| 2019/0012912 A1* | 1/2019 | Kim | G08G 1/096716 |
| 2019/0047585 A1 | 2/2019 | Kagerer et al. | |
| 2019/0064800 A1* | 2/2019 | Frazzoli | G05D 1/0061 |
| 2020/0031363 A1* | 1/2020 | Xiang | B60W 50/085 |

FOREIGN PATENT DOCUMENTS

| | | |
|---|---|---|
| DE | 10 2004 024 705 A1 | 12/2005 |
| DE | 10 2007 036 787 A1 | 2/2009 |
| DE | 10 2010 056 389 A1 | 6/2012 |
| DE | 10 2014 208 185 A1 | 11/2015 |
| DE | 10 2016 006 980 A1 | 2/2017 |
| DE | 10 2016 206 852 A1 | 10/2017 |

* cited by examiner

DRIVER ASSISTANCE SYSTEM AND METHOD FOR AUTOMATED DRIVING WITH AUTOMATED LONGITUDINAL GUIDANCE

BACKGROUND AND SUMMARY OF THE INVENTION

The invention relates to a driver assistance system for a motor vehicle and to a method for automated driving with automated longitudinal guidance, wherein when automated longitudinal guidance is active in an automatic mode, longitudinal guidance is brought about taking into account a predefinable setpoint speed.

Motor vehicles with automated longitudinal guidance (referred to as cruise control systems) have been known for a long time. Most of the currently available cruise control systems adjust the speed of the motor vehicle to a desired speed or setpoint speed which is predefined by the driver. In addition to these longitudinal control systems, it is also possible to acquire longitudinal control systems which are expanded with inter-vehicle distance control, referred to as adaptive longitudinal control systems or cruise control systems, from some manufacturers. Such systems which are offered, for example, under the designation "active cruise control" by the Applicant of the present patent application make it possible to guide the motor vehicle automatically at a desired or correspondingly relatively low speed while maintaining a desired distance from a vehicle traveling ahead. In this context, in principle the generally known longitudinal control or cruise control which maintains a specific predefined distance is expanded with an additional inter-vehicle distance control function or an adaptive cruise control mode so that the use of such "active" cruise control becomes possible even in dense freeway traffic and highway traffic. This so-called "active cruise control" maintains the predefined desired distance or setpoint distance when the vehicle's own lane is free (=free travel mode). If an inter-vehicle distance sensor system which is mounted on the motor vehicle and which can operate, in particular, on a radar and/or camera basis and/or laser basis detects a target object or (motor) vehicle traveling ahead in its own lane, its own speed is adapted—for example by bringing about a suitable braking torque or drive torque—to the speed of the motor vehicle traveling ahead in such a way that an inter-vehicle distance control system which is contained in the "active cruise control" or in the corresponding longitudinal control system automatically maintains a situation-appropriate setpoint distance, or to be more precise a predefined time interval, with respect to the motor vehicle or target object traveling ahead (=adaptive cruise control mode).

The latest further developments of driver assistance systems with automated longitudinal guidance make possible (optionally taking into account a maximum speed or maximum setpoint speed which is predefined by the driver) automated adaptation of the speed according to the criteria of the Highway Traffic Regulations (HTR) and driving safety. The vehicle therefore generally drives at the permitted maximum speed or at a guide speed (setpoint speed) which is predefined for the corresponding road, maintains a distance from vehicles traveling ahead which is appropriate to the external circumstances or brakes for cornering and turning processes correspondingly. Such further developments can also be used within the scope of an autonomous driving mode.

The object of the invention is to provide a system which is improved with respect to the comfort of the vehicle occupants and a corresponding method for a driver assistance system with automated longitudinal guidance.

This object is achieved by a driver assistance system, by a method, and by a correspondingly embodied computer program product, in accordance with the claimed invention. Further advantageous refinements are specified in the dependent claims.

The invention is based on a basically known driver assistance system (cruise control system) for a motor vehicle for automated driving with automated longitudinal guidance, wherein when automated longitudinal guidance is active, the longitudinal guidance occurs either in an automatic mode which is embodied as a free travel mode as explained at the beginning or in an automatic mode which is embodied as an adaptive cruise control mode, depending on the traffic environment. If an automated braking process occurs into the stationary state, in known systems automated continued travel and therefore acceleration and automated longitudinal guidance is not permitted, at least in the case of relatively long stationary state phases, until after confirmation by the user. Depending on the traffic situation, after confirmation, the automated longitudinal guidance is resumed in the free travel mode or adaptive cruise control mode. The confirmation can be implemented either by actuation of an operator element (e.g. resume) or by gentle depressing of the accelerator pedal.

The invention is based on the recognition that in specific situations (e.g. before junctions or turning situations) in which braking of the vehicle as far as into the stationary state occurs within the scope of the automated longitudinal guidance, automated longitudinal guidance according to the known adaptive cruise control and free travel modes is not desired in every situation when travel is resumed. In particular, in specific traffic situations in which there is no vehicle present in front when the automated longitudinal guidance is resumed from the stationary state of the vehicle, acceleration to the setpoint speed which has been set or to the permitted maximum speed does not always correspond to the driver's wishes.

Taking into account the above recognition, the core of the invention consists in detecting situations in which automated longitudinal guidance in the automatic mode (free travel mode or adaptive cruise control mode) is not desired after the automated braking of the vehicle into the stationary state, and to react correspondingly without severely influencing the comfort of automated longitudinal guidance of the vehicle. If such situations are detected, there is to be at least temporarily a departure from the customary logic of the automated longitudinal guidance, without significantly changing the overall logic.

Against this background, according to a first aspect of the present invention, a driver assistance system for a motor vehicle for automated driving with automated longitudinal guidance is proposed, wherein in the usual case when automated longitudinal guidance is active in an automatic mode (=adaptive cruise control mode or free travel mode), automated longitudinal guidance is brought about taking into account a predefinable setpoint speed. This driver assistance system comprises a first detection unit configured to detect a defined stationary state situation which occurs or has occurred owing to a preceding automated braking process of the motor vehicle into the stationary state, a second detection unit configured to detect accelerator pedal actuation, and an evaluation and control unit configured to at least temporarily activate a manual mode when accelerator pedal actuation is detected in or during a detected defined stationary state situation.

Analogously to this, according to a further aspect of the invention, a method for automated driving with automated longitudinal guidance is proposed, wherein when automated longitudinal guidance is active in an automatic mode (=adaptive cruise control mode or free travel mode), automated longitudinal guidance is brought about taking into account a predefinable setpoint speed, and the method comprises the following steps:

detecting a defined stationary state situation which occurs owing to a preceding automated braking process of the motor vehicle into the stationary state, detecting accelerator pedal actuation, and at least temporarily activating a manual mode when accelerator pedal actuation is detected in or during a detected defined stationary state situation.

Developments proposed below apply both to the system according to the invention and to the method according to the invention, in particular also to a computer program product with control commands which execute the proposed method when they are executed on a computer.

The term "automated driving" can be understood within the scope of the document to mean driving with automated longitudinal guidance or autonomous driving with automated longitudinal and transverse guidance. The term "automated driving" comprises automated driving with any desired degree of automation. Exemplary degrees of automation are assisted, partially automated, highly automated or fully automated driving. These degrees of automation have been defined by the Bundesanstalt für Straßenwesen (BASt) [German Federal Highway Research Agency] (see BASt publication "Forschung kompakt" ["Research News"], issue November 2012). During assisted driving, the driver continuously carries out the longitudinal or transverse guidance while the system performs the respective other function within certain limits.

The motor vehicle may be any type of vehicle with a drive system which is designed to participate in road traffic and permits automated intervention into the longitudinal guidance. The drive system may be, for example, a conventional drive system with an internal combustion engine, a hybrid drive system with an internal combustion engine and electric motor, or a purely electrically operated drive system. Other drive systems are also conceivable.

The setpoint speed can be predefined either manually by the driver or in an automated fashion. In the case of a predefinition which is automated or can be influenced in an automated fashion, the setpoint speed can be predefined as a function of a permissible maximum speed or a guide speed (setpoint speed) which is predefined for the corresponding road.

The first detection unit which is configured to detect a defined stationary state situation which has occurred owing to a preceding automated braking process of the motor vehicle into the stationary state can for this purpose evaluate relevant sensor signals (e.g. speed sensor signals, camera signals, etc.) or access sensed and/or conditioned signals of other systems or units. Likewise, the second detection unit which is configured to detect actuation of the accelerator pedal can evaluate relevant sensor signals (e.g. an accelerator pedal sensor) or access sensed and/or conditioned signals of other systems or units. The first and second detection units can be embodied as separate units, combined in one unit or be part of the evaluation and control unit.

The evaluation and control unit which is configured to activate a manual mode when accelerator pedal actuation is detected in or during a detected defined stationary state situation can transmit either corresponding actuation signals directly to an actuation system (drive, brake) which influences the longitudinal guidance or to an intermediately connected unit which brings about corresponding interventions into the longitudinal guidance on the basis of this request and, if appropriate, further requests in respect of the longitudinal acceleration.

A defined stationary state situation which occurs owing to a preceding automated braking process of the motor vehicle can advantageously be achieved only if the motor vehicle is not braked into the stationary state owing to a target object traveling ahead. In one particularly advantageous refinement of the invention, a defined stationary state situation is detected when the motor vehicle has been braked in an automated fashion into the stationary state owing to a detected (relevant) traffic infrastructure event. A relevant traffic infrastructure event (road signs, traffic light systems, traffic rules such as e.g. "give way to the right") is to be understood as events which are significant for the motor vehicle. If, for example, different traffic infrastructure events apply to different upcoming driving maneuvers (turn at a junction or drive straight ahead), it is advantageous if at first the traffic infrastructure event which is relevant for the driving maneuver can be identified unambiguously so that only this event is taken into account.

In a further advantageous refinement of the invention, a defined stationary state situation is detected in particular when the motor vehicle has been braked in an automated fashion into the stationary state owing to a detected (relevant) traffic infrastructure event which requires the right of way to be granted to other road users (e.g. give way road sign, give way to the right rule), and/or a traffic infrastructure event which temporarily prohibits moving on (stop sign, red traffic light). If such a traffic infrastructure event is detected, it is to be assumed that when travel is resumed from the stationary state the driver would not necessarily wish to remain in the automatic mode, since heightened attention toward other road users is still required.

Since heightened attention is necessary in particular when driving off again in situations in which there is not a road user located in front of the motor vehicle, and therefore the speed of the motor vehicle in question would not be limited, in a further advantageous refinement of the invention when accelerator pedal actuation is detected in or during a detected defined stationary state situation the manual mode is activated only if a vehicle or target object which is located ahead (and which would in any case temporarily limit the acceleration of the motor vehicle to the permitted maximum speed or setpoint speed) is not detected at the time of the accelerator pedal actuation.

The manual mode which is to be activated in the above-mentioned defined initial situations differs firstly from the automatic mode of the automated longitudinal guidance as result of the fact that the speed which is to be set or the acceleration of the vehicle is not set on the basis of the predefined setpoint speed but rather taking into account (further) driver specifications of the driver. In the activated manual mode a driving speed which is dependent on the accelerator pedal actuation is advantageously brought about, said speed corresponding, in particular, at maximum to the speed which is to be brought about and which is predefined by the accelerator pedal actuation. In order to give the driver at least the sensation that he is controlling the driving speed or acceleration himself in this situation, the driving speed or acceleration is ideally derived directly from the actuation of the accelerator pedal so that a driving speed or acceleration is set which would also be set when the automated longitudinal control is deactivated.

In contrast to the automatic mode, in the manual mode manual deceleration is preferably also permitted without interrupting or deactivating the automated longitudinal guidance. In order to be able to permit deceleration of the vehicle in the manual mode without interrupting or deactivating the automated longitudinal guidance, the device according to the invention additionally comprises, in one further advantageous refinement, a third sensing unit which can be part of the first and/or second detection unit and is configured to sense brake pedal actuation. If brake pedal actuation is sensed in the active manual mode, braking of the vehicle is brought about without exiting the manual mode. Contrary to the fundamental logic in the automatic mode, namely that interruption or deactivation of the automated longitudinal guidance is brought about when the brake pedal is actuated with the longitudinal guidance active, in this case interruption or deactivation of the automated longitudinal guidance is not brought about. When brake pedal actuation is sensed in the active manual mode, braking of the vehicle is advantageously brought about without exiting the manual mode only if the brake pedal actuation or a brake value which correlates with the brake pedal actuation (e.g. deceleration which is requested or brought about, braking torque which is requested or brought about, brake pressure which is requested or built up) does not exceed a predefined brake threshold. If the brake threshold is exceeded, the automated longitudinal guidance is interrupted or deactivated.

In a further advantageous refinement of the invention, a suitable procedure is proposed for permitting simple and sensible return from the manual mode into the automatic mode. There can advantageously be provision that the active manual mode is deactivated in an automated fashion if at least one predefined abort criterion is satisfied. When the manual mode is deactivated, at the same time the automatic mode is reactivated and therefore automated longitudinal control occurs taking into account a predefinable setpoint speed in the free travel mode or adaptive cruise control mode.

The activated manual mode is advantageously deactivated (and the automatic mode reactivated) if, as an abort criterion, the driving speed exceeds a predefined speed limiting value, and/or the distance traveled in the manual mode and/or the distance traveled since a detected (relevant) traffic infrastructure event was passed exceeds a predefined distance limiting value, and/or actuation of a defined operator control element is sensed, a turning situation is detected, a predefined turning angle is reached or exceeded, and/or a predefined traffic area which was passed through in the manual mode is exited.

The speed limiting value can be a fixedly or variably predefinable speed limiting value. The value can, for example, be predefined on the basis of determined data (e.g. within a locality, outside a locality, as a function of the class of road, the weather, time of day, traffic environment) and/or can be set and/or adapted as a function of driver specifications and/or as a function of the driving style or driving behavior.

In an analogous fashion to the speed limiting value, the distance limiting value can be predefinable in a fixed or variable fashion. This limiting value can likewise be predefined, for example, on the basis of determined data (e.g. within a locality, outside a locality, as a function of the class of road, the weather, time of day, traffic environment) and/or can be set and/or adapted as a function of driver specifications and/or as a function of the driving style or driving behavior.

Actuation of a defined operator control element can be understood, for example, to mean actuation of an existing resume pushbutton key which usually causes the automated longitudinal guidance to be resumed from the interrupted state. Likewise, actuation of a so-called SET pushbutton key, which usually brings about activation of the automated longitudinal guidance from the interrupted state, can also be evaluated and correspondingly taken into account.

The evaluation of the attainment or exceeding of a predefined turning angle when a turning situation is detected (e.g. turning to the right) permits simple detection of an (at least virtually) concluded traffic situation in which manual longitudinal guidance of the vehicle appears necessary and appropriate. The turning angle can be predefined fixedly or variably, in particular on the basis of navigation data which is present (in conjunction with route data). Therefore, e.g. according to the navigation data in the case of turning right there is provision for the vehicle to rotate by more than 90° (approximately 96°).

A traffic area, at the exiting of which automatic deactivation of the manual mode is to take place, can be, for example, an junction area. If the driver exits the junction area after "feeding" into it, it can be assumed that he desires to return to the automatic mode of the automated longitudinal guidance.

In addition, these abort criteria can be linked to a further condition. For example it is possible for deactivation of the manual mode and return into the automatic mode to also take place only if the actuation of the accelerator pedal is canceled after a speed limiting value and/or route limiting value is exceeded and/or after the defined traffic area is exited. In this context, a suitable transition from the "manual" driving speed into the speed specification from the automatic mode must be implemented.

The invention will now be explained in more detail with reference to the following exemplary embodiment.

DETAILED DESCRIPTION OF THE DRAWINGS

Figure 1:
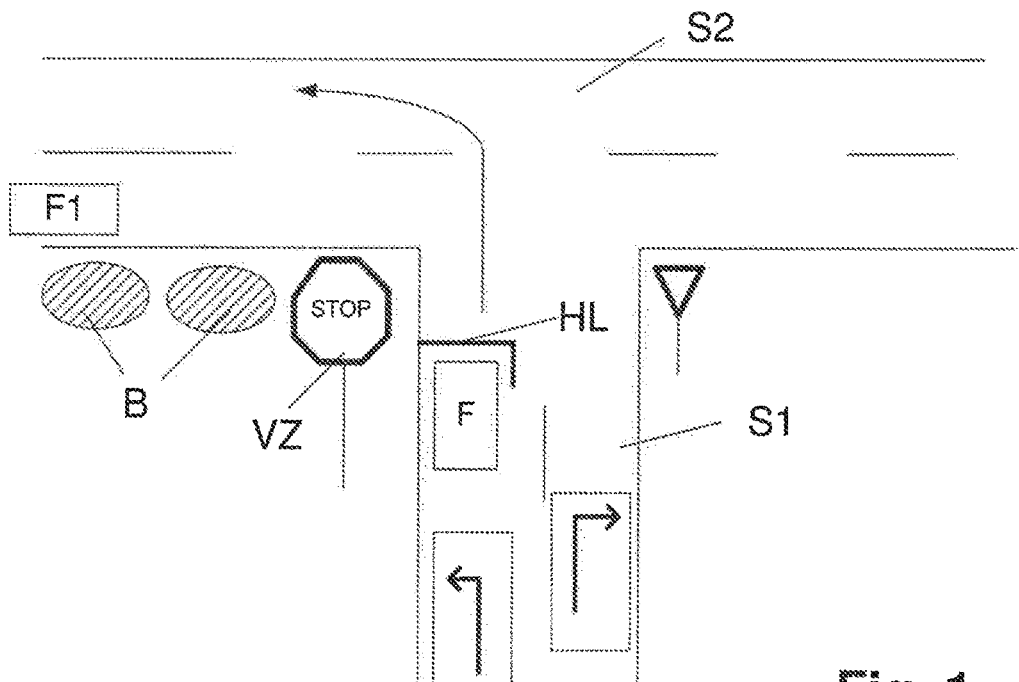
FIG. 1 shows a traffic situation which is relevant to the invention.

The traffic situation illustrated in FIG. 1 shows a so-called T junction, wherein a vehicle F is located on the road 51 and wishes to turn to the left into the road S2. The road sign (VZ) which is embodied as a stop sign and is mounted on the left-hand edge of the road applies to the left-hand turning lane of the road 51 and obliges the driver of the vehicle F to stop at the stop line HL of the left-hand lane before the turning maneuver. Owing to the planting B arranged at the road edge of the road S2, the road S2 is difficult to see for the driver of the vehicle F from the stop line HL so that after resuming travel the driver firstly usually feeds slowly into the junction area in order to be able to clearly see the traffic moving laterally on the road S2 (e.g. vehicle F1).

Figure 2:
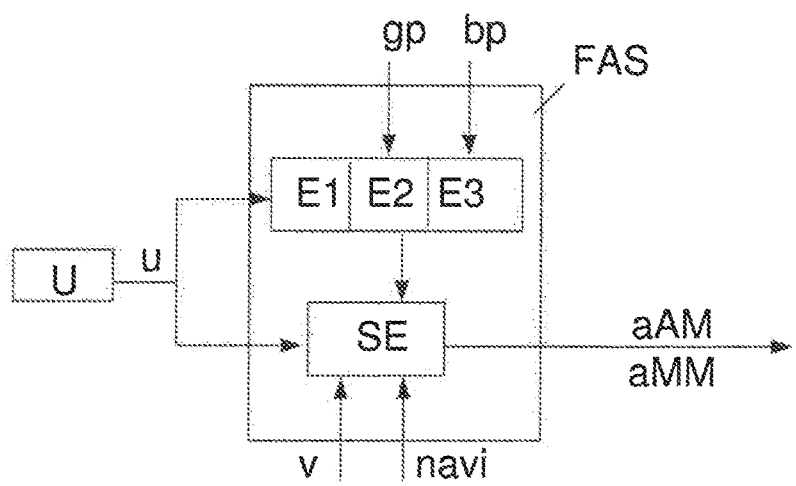
FIG. 2 shows an exemplary design of a driver assistance system according to an embodiment of the invention.
Figure 3:
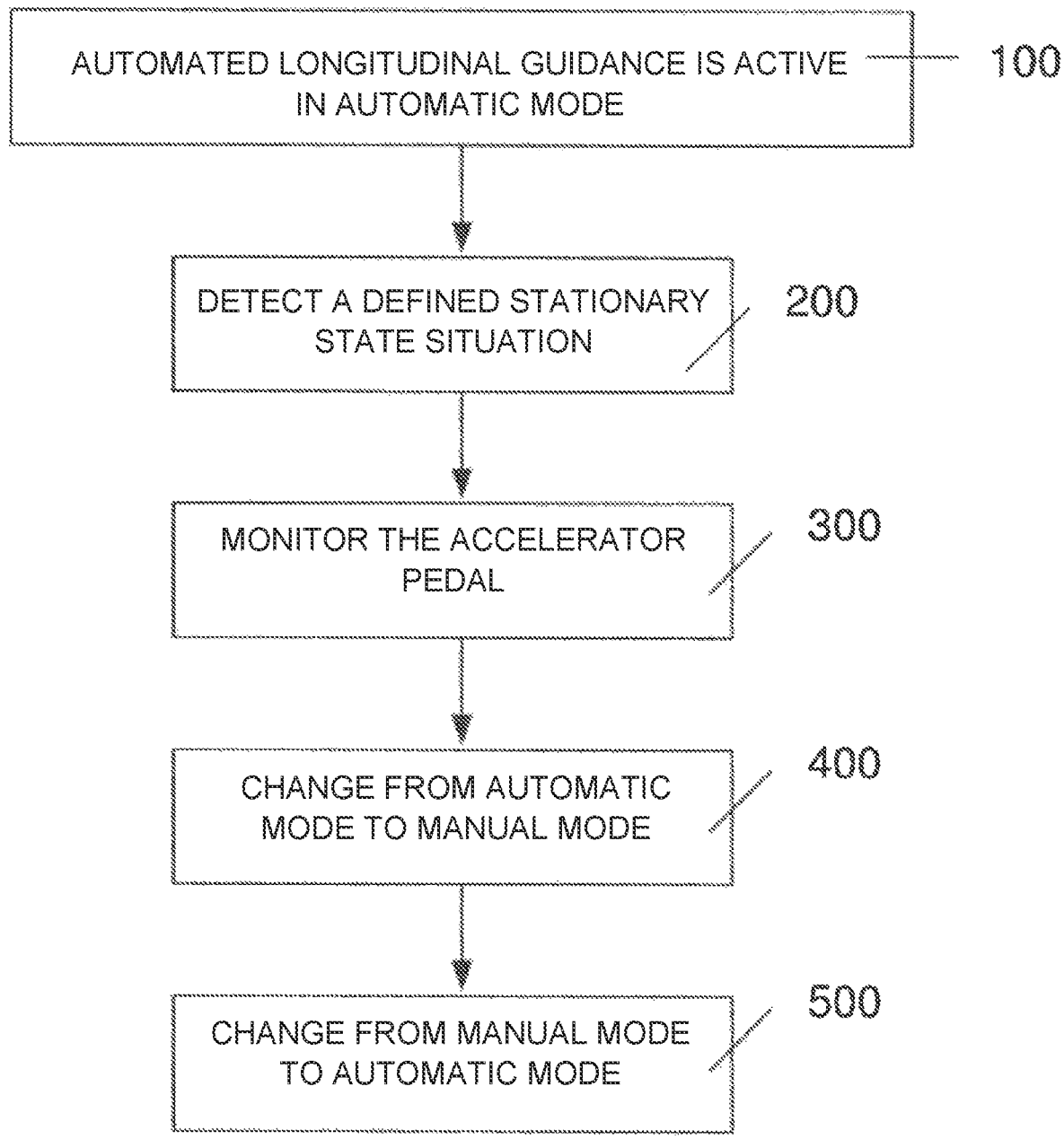
FIG. 3 shows a simplified flow diagram of a method according to an embodiment of the invention.

In order to be able to cope well with such a traffic situation with automated longitudinal guidance, FIG. 2 shows a design of a driver assistance system FAS for a motor vehicle for automated driving with automated longitudinal guidance, wherein when automated longitudinal guidance is active in the automatic mode, longitudinal guidance is brought about taking into account a predefinable setpoint speed. A specific precondition, as will be explained in detail below with reference to FIG. 3, is that there is an automated change from the automatic mode into a manual mode.

The driver assistance system FAS comprises an evaluation and control unit SE which, when automated longitudinal guidance is active in the active mode, brings about cruise control on the basis of available information (e.g. information on the surroundings u from a surroundings sensor system U, information about the current speed v and the course of the route navi) taking into account a predefinable setpoint speed in the free travel mode or adaptive cruise control mode. This so-called "active cruise control" maintains the predefined desired or setpoint speed if the vehicle's own lane is free (=free travel mode). If an inter-vehicle distance sensor system which is mounted on the motor vehicle and which can operate, in particular, on a radar, camera, and/or laser basis detects a target object or (motor) vehicle which is traveling ahead in its own lane, the speed of the vehicle in question is adapted—for example by bringing about a suitable braking torque or drive torque—to the speed of the motor vehicle traveling ahead in such a way that an inter-vehicle distance control system which is contained in the "active cruise control system" or in the corresponding longitudinal control system automatically maintains a situation-appropriate setpoint distance, or more precisely a predefined time interval, with respect to the motor vehicle or target object which is traveling ahead (=adaptive cruise control mode). If actuation of the brake pedal in the automatic mode is sensed, the automated longitudinal guidance is at least interrupted.

Furthermore, the driver assistance system FAS comprises a detection unit in which a first, second and third detection unit E1, E2 and E3 are integrated. The first detection unit E1, which likewise at least receives and evaluates data u from a surroundings sensor system U which is present, is configured to detect a defined stationary state situation which occurs owing to a preceding automated braking process of the motor vehicle into the stationary state. The second detection unit E2 is configured to detect accelerator pedal actuation gp. The third detection unit E3 is configured to detect brake pedal actuation bp.

The situations or actuation operations which are detected by the three determining units E1, E2 and E3 are transmitted to an evaluation and control unit SE which is configured to activate a manual mode by emitting a signal aMM when accelerator pedal actuation gp is detected in or during a detected defined stationary state situation. With the activation of the manual mode, at the same time the (initially active) automatic mode is deactivated. If brake pedal actuation bp is sensed during the manual mode, contrary to the logic in the automatic mode there is no interruption or deactivation of the automated longitudinal guidance.

In the manual mode, the control unit SE additionally evaluates information about the presence of abort criteria. If an abort criterion is detected, the control unit SE brings about deactivation of the manual mode and reactivation of the automatic mode by emitting a signal aAM.

A detailed exemplary refinement of the method according to the invention is shown in FIG. 3. The flow diagram illustrated in FIG. 3 starts in step 100 as soon as automated longitudinal guidance is active and cruise control takes place in an automatic mode taking into account a predefinable setpoint speed. The automatic mode comprises the free travel and adaptive cruise control modes which are known from the prior art, so that in the case of free travel automated cruise control to a predefined and/or permitted setpoint speed occurs, and in the adaptive cruise control mode automated cruise control for maintaining a predefined setpoint distance from the detected target object takes place.

Starting from step 100, in step 200 necessary information which makes it possible to detect a defined stationary state situation which occurs owing to a preceding automated braking process of the motor vehicle into the stationary state is evaluated. In detail, it is monitored, for example, whether the vehicle has been braked in an automated fashion into the stationary state owing to a road sign (e.g. stop sign) which temporarily prohibits the motor vehicle from moving on or which requires the right of way to be granted to other road users (e.g. give way to the right rule). If such a defined stationary state situation is detected, in step 300 the accelerator pedal is monitored with respect to actuation of the accelerator pedal during the stationary state phase. If no actuation of the accelerator pedal is sensed during the detected stationary state situation (i.e. the stationary state situation is ended owing to an automatically initiated acceleration or because of actuation of an operator control element which permits or confirms automatic driving off from the stationary state), the method is aborted and a jump back to step 100 occurs.

However, if accelerator pedal actuation is detected in step 300 during the defined stationary state situation, the process proceeds to step 400, and within the scope of step 400 a change from the automatic mode into a manual mode of the automated longitudinal guidance is executed. While the manual mode is active, temporary "manual" cruise control occurs during which the driving speed is predefined directly by the type of actuation of the accelerator pedal. Likewise, when brake pedal actuation is detected in the manual mode, there is no interruption or deactivation of the automated longitudinal guidance, but rather only deceleration occurs in accordance with the brake pedal actuation.

Furthermore, while the manual mode is active in step 400, defined abort criteria are monitored. As an abort criterion it is monitored, for example, whether the driving speed which is reached exceeds a predefined speed limiting value of e.g. 10 or 20 km/h and/or a predefined traffic area (e.g. junction area) has been exited and/or a resume pushbutton key which is present has been actuated in order to resume the automatic mode. If it is detected that an abort criterion is satisfied, the process proceeds to step 500 and a change from the manual mode (back) into the automatic mode is brought about. In this automatic mode, automated longitudinal guidance occurs—as in conventional cruise control systems—taking into account a predefinable setpoint speed, i.e. as long as a target object is not detected, the vehicle is accelerated again in an automated fashion to the predefined or permitted maximum speed. If a target object is detected, cruise control occurs in such a way that a predefined distance from the detected target object is not undershot.

This invention therefore permits, for example, a vehicle to feed into junctions with poor visibility without deactivating the automated longitudinal guidance. By means of the definition of suitable abort criteria, there is an automated and transparent return into the automatic mode with completely automated longitudinal guidance.

What is claimed is:

1. A driver assistance system for a motor vehicle for automated driving with automated longitudinal guidance, wherein when automated longitudinal guidance is active in an automatic mode, automated longitudinal guidance is brought about taking into account a predefined setpoint speed, comprising:
   at least one processing device configured to:
   detect a defined stationary state situation which occurs owing to a preceding automated braking process of the motor vehicle into the stationary state;
   detect accelerator pedal actuation;
   temporarily activate a manual mode of the automated longitudinal guidance in response to accelerator pedal actuation detection during the detected defined stationary state situation, wherein, in the manual mode of the automated longitudinal guidance, a driving speed correspond to a speed that is predefined by the accelerator pedal actuation instead of the predefined setpoint speed;
   determine that at least one predefined abort criterion is satisfied by determining that the driving speed has reached and exceeded a predefined speed limiting value while in the manual mode; and
   automatically abort the manual mode of the automated longitudinal guidance and automatically resume the automatic mode of the automated longitudinal guidance in response to determining that the at least one predefined abort criterion is satisfied.

2. The driver assistance system according to claim 1, wherein
   the defined stationary state situation is detected when the motor vehicle has been braked in an automated fashion into the stationary state owing to a detected defined traffic infrastructure event.

3. The driver assistance system according to claim 1, wherein
   the defined stationary state situation is detected when the motor vehicle has been braked in an automated fashion into the stationary state owing to a detected defined traffic infrastructure event which requires granting right of way to other road users and/or temporarily prohibits the motor vehicle from moving on.

4. The driver assistance system according to claim 1, wherein the at least one processing device is further configured to:
   determine that no vehicle is detected ahead of the motor vehicle; and
   activate the manual mode of the automated longitudinal guidance in response to detecting accelerator pedal actuation in the defined stationary state situation and in response to determining that no vehicle is detected ahead of the motor vehicle.

5. The driver assistance system according to claim 1, wherein the at least one processing device is further configured to:
   detect brake pedal actuation while in the manual mode of the automated longitudinal guidance; and
   bring about braking of the vehicle in the manual mode of the automated longitudinal guidance in response to detecting brake pedal actuation, without cancelling the automated longitudinal guidance.

6. The driver assistance system according to claim 1, wherein the at least one processing device is configured to:
   automatically resume the automatic mode of the automated longitudinal guidance without requiring actuation of a resume button.

7. The driver assistance system according to claim 1, wherein the at least one processing device is configured to:
   determine that at least one predefined abort criterion is satisfied by determining that a distance traveled in the manual mode and/or a distance traveled since a detected traffic infrastructure event was passed exceeds a predefined distance limiting value.

8. The driver assistance system according to claim 1, wherein the at least one processing device is configured to:
   determine that at least one predefined abort criterion is satisfied by determining that a turning situation is detected and/or a predefined turning angle is reached or exceeded.

9. The driver assistance system according to claim 1, wherein the at least one processing device is configured to:
   determine that at least one predefined abort criterion is satisfied by determining that a predefined traffic area which was passed through in the automated longitudinal guidance manual mode is exited.

10. The driver assistance system according to claim 1, wherein the predefined speed limiting value is lower than the predefined setpoint speed.

11. A method for automated driving with automated longitudinal guidance, wherein when automated longitudinal guidance is active in an automatic mode, automated longitudinal guidance is brought about taking into account a predefined setpoint speed, the method comprising:
    detecting a defined stationary state situation which occurs owing to a preceding automated braking process of the motor vehicle into the stationary state;
    detecting accelerator pedal actuation;
    temporarily activating a manual mode of the automated longitudinal guidance in response to detecting the accelerator pedal actuation during the detected defined stationary state situation, wherein, in the manual mode of the automated longitudinal guidance, a driving speed correspond to a speed that is predefined by the accelerator pedal actuation instead of the predefined setpoint speed;
    determining that at least one predefined abort criterion is satisfied by determining that the driving speed has reached and exceeded a predefined speed limiting value while in the manual mode; and
    automatically aborting the manual mode of the automated longitudinal guidance and automatically resuming the automatic mode of the automated longitudinal guidance in response to determining that the at least one predefined abort criterion is satisfied.

12. A computer product comprising a non-transitory computer readable medium having stored thereon program code which, when executed by one or more processors, carries out a method comprising:
    operating a motor vehicle with automated longitudinal guidance active in an automatic mode of the automated longitudinal guidance, wherein, when in the automatic mode, automated longitudinal guidance is brought about taking into account a predefined setpoint speed;
    detecting a defined stationary state situation which occurs owing to a preceding automated braking process of the motor vehicle into the stationary state;
    detecting accelerator pedal actuation;
    temporarily activating a manual mode of the automated longitudinal guidance in response to detecting the accelerator pedal actuation during the detected defined stationary state situation, wherein, in the manual mode of the automated longitudinal guidance, a driving speed correspond to a speed that is predefined by the accelerator pedal actuation instead of the predefined setpoint speed;
determining that at least one predefined abort criterion is satisfied by determining that the driving speed has reached and exceeded a predefined speed limiting value while in the manual mode; and
automatically aborting the manual mode of the automated longitudinal guidance and automatically resuming the automatic mode of the automated longitudinal guidance in response to determining that the at least one predefined abort criterion is satisfied.

\* \* \* \* \*